United States Patent [19]

Waddell et al.

[11] 4,302,025
[45] Nov. 24, 1981

[54] PAPER SHEET MATERIAL HANDLING CART HAVING CENTRAL BRAKE ASSEMBLY

[75] Inventors: Gerald E. Waddell; Clayton W. Windler; Ronnie K. Swint, all of Emporia, Kans.

[73] Assignee: Kansa Corporation, Emporia, Kans.

[21] Appl. No.: 123,744

[22] Filed: Feb. 22, 1980

[51] Int. Cl.³ ............................................. B62B 5/04
[52] U.S. Cl. .............................. 280/79.1 A; 280/79.3; 188/5; 188/19
[58] Field of Search ...................... 280/79.1 A, 79.1 R, 280/98, 79.3; 188/5, 19, 23

[56] References Cited

U.S. PATENT DOCUMENTS

| | | | |
|---|---|---|---|
| 2,475,130 | 7/1949 | Davis | 188/5 |
| 2,833,550 | 5/1958 | Frick | 280/79.3 X |
| 2,897,910 | 8/1959 | Oteely et al. | 188/5 X |
| 2,899,010 | 8/1959 | Ledgerwood | 188/5 X |
| 3,307,658 | 3/1967 | Sterenson | 188/5 |
| 3,422,929 | 1/1969 | Oja et al. | 188/5 |
| 3,715,015 | 2/1973 | Morris | 188/5 |
| 3,917,203 | 11/1975 | Heubeck et al. | 188/5 X |

Primary Examiner—Joseph F. Peters, Jr.
Assistant Examiner—Norman L. Stack, Jr.
Attorney, Agent, or Firm—Schmidt, Johnson, Hovey & Williams

[57] ABSTRACT

An improved, mobile, compartmentalized cart for newspaper inserts or other sheet-type items is provided which includes selectively operable brake mechanism for fixing the cart against translatory movement while at the same time allowing the cart to rotate for providing easy individual access to the respective cart compartments. The cart is preferably provided with a central, elongated, axially reciprocable, spring-biased rod having a floor-engaging brake pad on the lower end thereof, with the cart being rotatable about an upright axis coincident with the rod. A cam latch is secured to the upper end of the rod for selectively raising the pad from the floor-engaging position thereof, and for holding the pad in such position. The cam latch is especially configured for allowing the rod and pad to shift downwardly, under the influence of the biasing spring, to a point where the pad is below the level of engagement between the floor and the cart casters. In this way a positive braking function is assured, even in the event of depressions or other irregularities in the floor surface.

11 Claims, 5 Drawing Figures

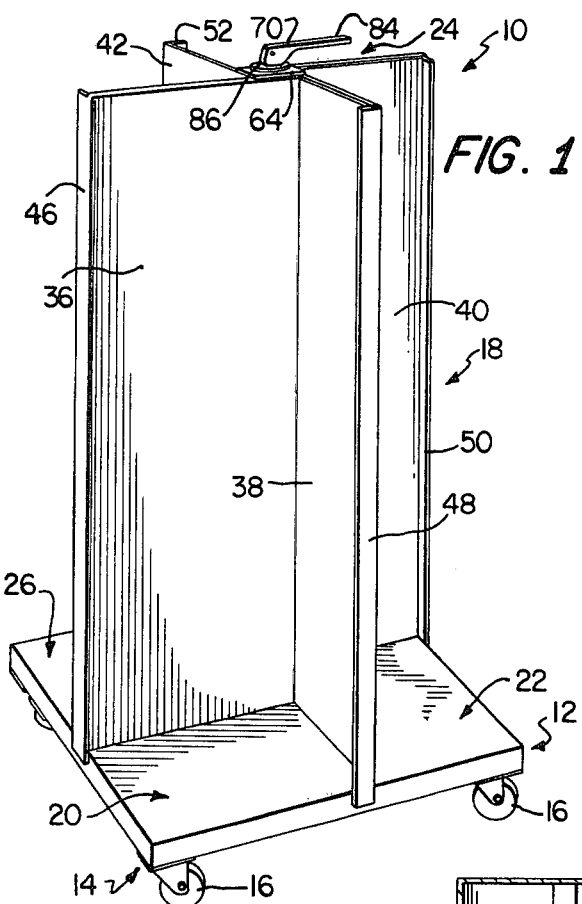
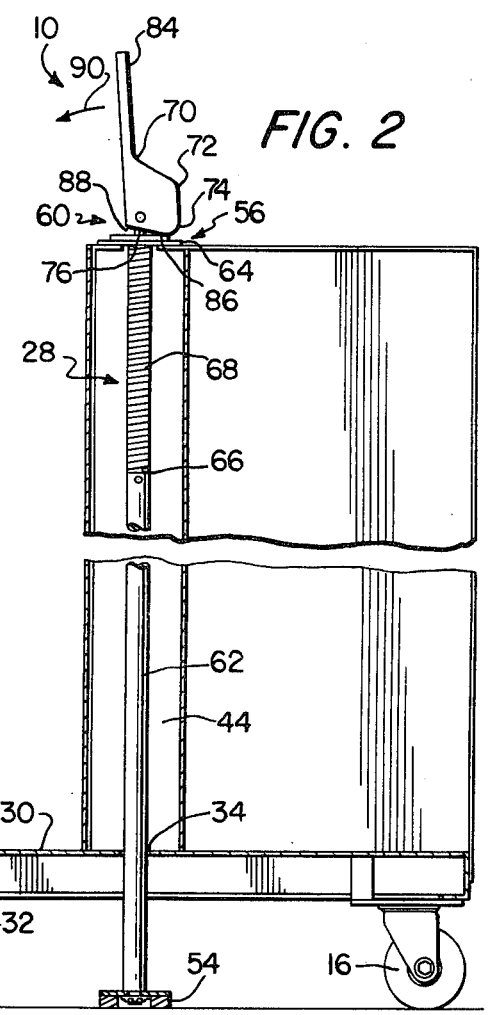
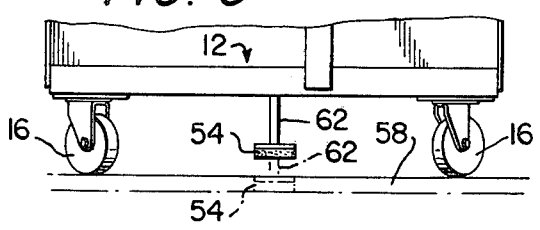
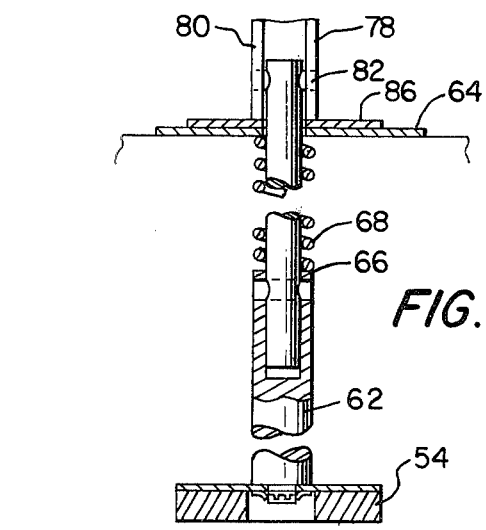
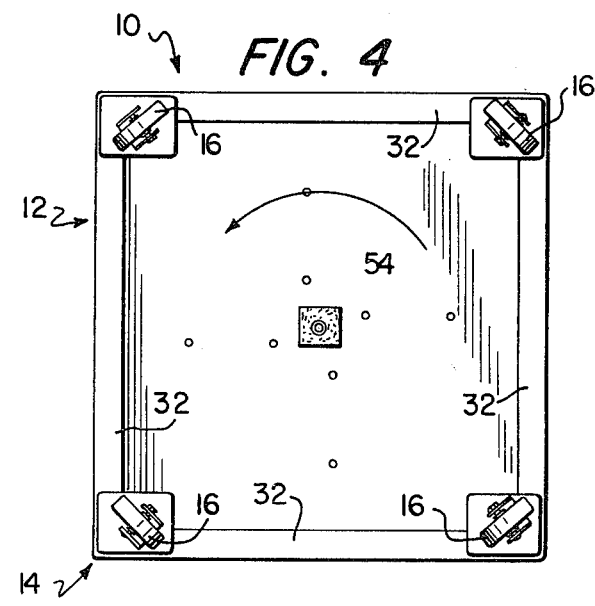

PAPER SHEET MATERIAL HANDLING CART HAVING CENTRAL BRAKE ASSEMBLY

BACKGROUND OF THE INVENTION

1. Field of the Invention

The present invention is concerned with an improved mobile cart for sheet-type or other items which is designed for maximum ease of access to the cart during use thereof. More particularly, it is concerned with such an improved cart which includes selectively operable brake mechanism for fixing the cart against translatory movement, while at the same time permitting pivoting of the cart about an upright axis for easy access to all portions of the cart from a single work station. In particularly preferred forms, the mechanism includes a shiftable, floor-engaging brake pad coupled to an elongated rod, and overtravel structure for allowing the pad to shift to a level below the level of engagement between the floor and cart-supporting casters.

2. Description of the Prior Art

In many newspapers and printing plants there is a need to move large quantities of printed material from place-to-place within the plant. For example, many newspapers now regularly include advertising inserts. Normally, these inserts are preprinted and must be fed to inserter mechanism by the plant personnel. In order to facilitate this task, it is a common practice to provide mobile carts or trucks which can be loaded with the preprinted inserts and wheeled to the inserter location. At this point the carts are simply unloaded and the inserts fed to the inserter.

While conventional carts or trucks are useful in this context, a number of problems remain. First, such carts tend to be rather large and bulky, and thus take up considerable floor space. Further, when fully loaded they are sometimes difficult to maneuver, particularly in restricted areas adjacent printing and inserter equipment. Also, during the unloading sequence, it is sometimes difficult to manipulate these carts or trucks so that easy access is provided to all of the sheet material thereon from a single work location adjacent an inserter. Finally, in the event that the floor surface in the plant is irregular, it sometimes occurs that the carts tend to roll away from the worker under the influence of gravity. Obviously, all of the above factors are undesirable from the standpoint of maximum efficiency.

SUMMARY OF THE INVENTION

The above problems are largely overcome by the present invention which provides a greatly improved cart apparatus particularly designed for use in and around a newspaper press room or other printing facility. Broadly speaking, the cart of the invention is mobile and includes a base, upstanding, compartment-defining wall structure secured to the base, and mechanism for fixing the cart against undesired translatory movement, while permitting pivoting of the cart about an upright axis for allowing easy access to all of the compartments respectively from but a single desired work station adjacent the cart. In this way the cart can be wheeled to a loading station, locked in place, and loaded; the cart can then be moved to another plant location (e.g., adjacent an inserter), again fixed against translatory movement, and unloaded.

Preferably, the cart includes a floor-engaging brake pad, means such as an elongated, axially reciprocable, spring-biased rod coupled to the pad and selectively shiftable into braking engagement with a floor or cart support surface. The cart is rotatable relative to the engaged brake pad, and the rod is coincident with the pivot axis of the cart. A cam latch is preferably coupled to the upper end of the pad-supporting rod which can be shifted between a braking position and a latching position; in the braking position the pad is in spring-biased contact with the underlying floor surface. Moreover, the cam latch is preferably configured such that the pad is allowed an overtravel and can extend to a point below the level of engagement between the floor surface and casters supporting the cart. In this manner a positive braking function is assured, even when the floor is irregular and the region thereof beneath the pad is somewhat lower than the region adjacent the casters.

BRIEF DESCRIPTION OF THE DRAWING

FIG. 1 is a perspective view of a cart in accordance with the invention;

FIG. 2 is a fragmentary vertical sectional view of the cart of the invention, with the brake mechanism thereof in operation;

FIG. 3 is a fragmentary view illustrating the lowermost end of the cart and depicting the overtravel operation of the brake mechanism;

FIG. 4 is a bottom view of the cart of the invention; and

FIG. 5 is a fragmentary view in partial vertical section further illustrating the construction of the brake mechanism.

DESCRIPTION OF THE PREFERRED EMBODIMENT

Turning now to the drawing, a cart 10 in accordance with the invention is illustrated. Broadly, the cart 10 includes a base 12 having means 14 in the form of four spaced casters 16 coupled to the underside of base 12 for rendering the same mobile. The cart further includes wall structure 18 secured to the upper surface of base 12 and extending upwardly therefrom for defining with the base 12, at least a pair, and more preferably four, separate, juxtaposed storage compartments 20, 22, 24 and 26. Finally, the cart 10 includes selectively operable brake mechanism broadly referred to by the numeral 28 for fixing cart 10 against translatory movement, while permitting pivoting of the cart about an upright axis, to thereby allow easy access to each of the compartments 20–26 from a single desired work station adjacent the cart.

In more detail, the base 12 is preferably a square, planar metallic member presenting an upper sheet-supporting plate or face having a depending circumscribing flange 32. The respective casters 16 are conventional, and are secured to the corners of flange 32 as best seen in FIGS. 2 and 4. Referring to FIG. 2, it will also be seen that the base is centrally apertured, i.e., an aperture 34 is provided through the plate 30.

Wall structure 18 includes four interconnected upright panels 36, 38, 40 and 42. Each of the panels is of equal height and extends from a central region of one of the sides of base 12 towards the center thereof. Furthermore, the panel pairs 36, 40 and 38, 42 are respectively in general alignment but are offset from one another, so that at the central area of the cart 10, the four panels cooperatively define an upright, hollow, elongated chamber 44 (see FIG. 2). The importance of this chamber 44 will be made clear hereinafter. Also, each of the panels include an outermost, transversely extending, sheet-retaining lip 46, 48, 50 or 52.

The brake mechanism 28 includes a square brake pad 54 located below plate 30, means referred to by the numeral 56 for selectively shifting the pad into engagement with the support surface 58 for the cart 10, and overtravel structure 60 for allowing shifting of the pad 54 to a level below the level of engagement between surface 58 and the casters 16, in the event that the region of the surface 58 proximal to pad 54 is lower than the regions thereof in engagement with the casters.

Pad shifting means 56 include an elongated, axially shiftable upright rod 62 which extends through the aperture 34, and supports the pad 54. The rod 62 is rotatable relative to pad 54 when the latter is in engagement with surface 58. The rod further extends through the chamber 44 and upwardly through an apertured plate 64 which closes the top of the chamber. As best seen in FIGS. 2 and 5, the rod 62 is a sectionalized member and presents a radially outwardly extending, circumferential should 66 at a point between the ends thereof and within chamber 44. A helical compression spring 68 is captured between shoulder 66 and the underside of plate 64, and serves to bias rod 62 and thereby pad 54 downwardly.

Means 56 also includes a cam member 70 presenting a latching surface 72, an arcuate region 74 and a braking surface 76. The cam member is preferably in the form of a pair of side-by-side, interconnected similarly configured plates 78, 80 (see FIG. 5) which straddle and receive the uppermost end of the rod 62. A pin 82 is employed to pivotally interconnect the member 70 to the rod 62 for pivoting movement of the member about a generally horizontal axis. For this purpose, the member 70 is provided with an elongated handle 84 and a large bearing washer 86 is interposed between the member 70 and the plate 64.

The overtravel structure 60, as noted above, allows pad 54 to descend, under the influence of spring 68, to a level below the lowermost level of the casters 16. For this purpose, the braking surface 76 is obliquely oriented relative to the upper surface of the washer 86, in order to define a space 88 between the latter and the lefthand end of surface 76 as the same is viewed in FIG. 2. The operation of the structure 60 will be fully explained below.

In the use of cart 10, the same is first wheeled to a desired work location, whereupon mechanism 28 is employed to fix the cart against translatory movement, and to permit full 360 degree rotation of the cart. Specifically, in the non-braking position of pad 54 wherein the latter is shifted away from surface 58, member 70 is in the FIG. 1 position thereof, with the handle 84 extending generally horizontally. When it is desired to actuate the mechanism 28, handle 84 is grasped and pulled upwardly until the latter assumes the FIG. 2 position. As can be appreciated, during this rotational movement of the member 70, continual contact with the underlying washer 86 is maintained, and moreover rod 62, and thereby pad 54, is ultimately shifted downwardly into engagement with the surface 58. Adequate braking contact is established and maintained by virtue of the compression spring 68, as will be readily understood. In the FIG. 2 braking position, translatory movement of the cart 10 is precluded because of the frictional contact between the pad 54 and surface 58. However, it will also be observed that the cart 10 can rotate a full 360 degrees about an axis coincident with rod 62 as noted above, during such rotation the rod 62 rotates relative to pad 54. It will be seen that such rotation of the cart greatly facilitates access to the respective cart compartments 20-26. In fact, a worker can load or unload into a given compartment, and thereafter simply rotate the cart until another compartment becomes accessible, and continue working. There is no need for the worker himself to move around the cart.

The overtravel structure 60 serves to ensure proper braking contact even in the event of an uneven floor or support surface. Specifically, an overtravel equal in length to the described spacing 88 is provided. That is to say, in the event that the casters 16 are in engagement with a portion of the surface 58 higher than the region thereof to be contacted by the pad 54, the member 70 is pivoted, under the influence of the spring 68, in a counterclockwise direction illustrated by the arrow 90 (FIG. 2) until pad 54 contacts the depressed region of the surface 58. Such action is best illustrated in FIG. 3, where it will be seen that the pad 54 descends to a level below that of the casters 16.

When it is desired to again elevate the pad 54 to its non-braking position, it is only necessary to rotate the member 70 back to the FIG. 1 position thereof, whereupon the latching surface 72 is in full engagement with the upper surface of the washer 86. At this point cart 10 can be wheeled about on the surface 58 in the usual fashion for further use.

Having thus described the invention, what is claimed as new and desired to be secured by Letters Patent is:

1. A mobile cart for sheet material or the like, comprising:
   a base;
   means supporting said base for movement thereof upon a support surface;
   wall structure secured to said base and extending upwardly therefrom for defining with the base at least a pair of separate sheet-receiving compartments; and
   selectively operable brake mechanism located at the central region of the cart for fixing said cart against translatory movement, and for permitting pivoting of the cart about an upright axis for allowing access to each of said compartments respectively from a single desired work station adjacent the cart.

2. The cart as set forth in claim 1 wherein said mechanism includes a brake pad, means for selectively shifting said pad into engagement with said support surface, and structure for allowing shifting of the pad to a level below the level of engagement between the support surface and said supporting means, in the event that the region of said support surface proximal to said pad is lower than the region of said support surface in engagement with said supporting means.

3. The cart as set forth in claim 1 wherein said mechanism includes:
   a brake pad for engaging said support surface;
   means for biasing said pad in a direction for said engagement with said support surface; and
   means for selectively shifting said pad away from said support surface against the bias of said biasing means, and for releasably holding said pad in said shifted away position.

4. The cart as set forth in claim 3 wherein said shifting and holding means comprises:
   an elongated, axially shiftable upright rod for defining said pivot axis;

means mounting said pad on the lower end of said rod;

a cam member presenting a braking surface and a latching surface;

a plate free of said rod and adjacent said cam member;

means pivotally securing said member to said rod for movement of the member, with corresponding axial shifting of said rod and pad, between a braking position wherein said braking surface is in contact with the plate and said pad engages said support surface, and a latching position wherein said latching surface is in contact with said plate and said pad is in the shifted away position thereof.

5. The cart as set forth in claim 4 wherein said braking and support surfaces of said cam member are cooperatively configured for permitting movement of said pad, under the influence of said biasing means, to a level below the level of engagement of said support surface and supporting means.

6. The cart as set forth in claim 4 wherein said biasing means comprises a helical compression spring operatively disposed about said rod.

7. The cart as set forth in claim 1 wherein said pivot axis is located at substantially the center of said base.

8. The cart as set forth in claim 1 wherein said wall structure presents four separate compartments.

9. The cart as set forth in claim 1 wherein said supporting means comprises a series of casters mounted on said base.

10. A mobile cart for sheet material or the like comprising:

a base having a central aperture therethrough;

means supporting said base for movement thereof upon a support surface;

wall structure secured to said base and extending upwardly therefrom for defining with the base at least a pair of separate sheet-receiving compartments; and brake mechanism for fixing said cart against translatory movement, and for permitting pivoting of the cart about an upright axis, including an elongated, axially shiftable upright rod defining said axis and extending through said aperture;

a brake pad mounted on the lower end of said rod for engaging said support surface, said pad being rotatable relative to said rod;

spring means for biasing said rod and pad in a direction for said engagement with said support surface; and means for selectively shifting said rod and pad away from said support surface against the bias of said biasing means, and for releasably holding said rod and pad in said shifted away position.

11. The cart as set forth in claim 10 wherein said mechanism includes structure for allowing shifting of the rod and pad to an extent such that the pad is located at a level below the level of engagement between said support surface and said supporting means, in the event that the region of said support surface proximal to said pad is lower than the region of the support surface in engagement with said supporting means.

* * * * *